(12) United States Patent
Barra et al.

(10) Patent No.: US 10,248,134 B2
(45) Date of Patent: Apr. 2, 2019

(54) METHODS AND SYSTEMS FOR RECONFIGURING A VEHICLE GEOMETRY

(71) Applicant: GM GLOBAL TECHNOLOGY OPERATIONS LLC, Detroit, MI (US)

(72) Inventors: Nicholas A. Barra, Northville, MI (US); Scott W. Damman, White Lake, MI (US); Nicholas D. Theis, St. Johns, MI (US); Michael E. McGuire, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 15/336,861

(22) Filed: Oct. 28, 2016

(65) Prior Publication Data

US 2018/0120863 A1 May 3, 2018

(51) Int. Cl.
*B60J 7/08* (2006.01)
*B60N 2/00* (2006.01)
*B60N 2/02* (2006.01)
*G05D 3/10* (2006.01)

(52) U.S. Cl.
CPC ............ *G05D 3/10* (2013.01); *B60J 7/08* (2013.01); *B60N 2/002* (2013.01); *B60N 2/0224* (2013.01)

(58) Field of Classification Search
CPC .. G05D 3/10; B60J 7/08; B60N 2/002; B60N 2/0224
See application file for complete search history.

(56) References Cited

U.S. PATENT DOCUMENTS

| | | | | |
|---|---|---|---|---|
| 6,138,068 A * | 10/2000 | Liu | ............. | B60H 1/243 236/44 C |
| 6,325,447 B1 * | 12/2001 | Kuo | ............. | B60P 3/341 296/160 |
| 6,505,873 B1 * | 1/2003 | Crean | ............. | B60P 3/34 296/165 |
| 7,090,286 B1 * | 8/2006 | Foreth | ............. | B60P 3/341 296/173 |
| 2007/0290497 A1 * | 12/2007 | Arendt | ............. | B62K 9/00 280/828 |
| 2009/0007948 A1 * | 1/2009 | Dempsey | ............. | B60P 3/341 135/96 |
| 2009/0261610 A1 * | 10/2009 | Kreil | ............. | B60P 3/34 296/26.13 |
| 2014/0210593 A1 * | 7/2014 | Cattermole | ............. | G08C 17/02 340/5.61 |
| 2017/0267087 A1 * | 9/2017 | Shinohara | ............. | B60J 7/0084 |
| 2018/0079348 A1 * | 3/2018 | Ronsen | ............. | B60P 3/34 |

* cited by examiner

*Primary Examiner* — Thomas Ingram (57) ABSTRACT

A system for reconfiguring a vehicle geometry is disclosed. The system includes a configuration system configured to alter the vehicle geometry, a communication system, and a controller in communication with the configuration system and the communication system, the controller configured to receive a configuration signal from the communication system, determine a configuration control signal, and automatically control the configuration system based on the control signal.

20 Claims, 10 Drawing Sheets

METHODS AND SYSTEMS FOR RECONFIGURING A VEHICLE GEOMETRY

The present invention relates generally to the field of vehicles and, more specifically, to methods and systems for determining a vehicle geometry configuration and reconfiguring the vehicle geometry based on vehicle capacity and aerodynamic considerations.

Vehicle geometry or configuration is a balance of aerodynamic considerations and interior space capacity. Autonomous vehicles in particular can vary greatly in capacity requirements for passengers and cargo.

SUMMARY

Embodiments according to the present disclosure provide a number of advantages. For example, embodiments of a vehicle according to the present disclosure could be reconfigured depending on the desired interior volume to optimize aerodynamic performance. Configurable vehicle geometry can also be used to optimize vehicle sizing, in particular, vehicle interior headroom, based on the number of occupants or occupant preference. Additionally, configurable vehicle geometry can be used to optimize vehicle aerodynamics by altering the vehicle's frontal area.

In one aspect, a system for reconfiguring a vehicle geometry includes a configuration system configured to alter the vehicle geometry, a communication system, and a controller in communication with the configuration system and the communication system, the controller configured to receive a configuration signal from the communication system, determine a configuration control signal, and automatically control the configuration system based on the control signal.

In some aspects, the system further includes an input device, wherein the communication system is configured to communicate with the input device. In some aspects, the configuration system includes a rack and pinion mechanism. In some aspects, the configuration system includes a pneumatic mechanism. In some aspects, the configuration system includes a hydraulic mechanism. In some aspects, the configuration system includes a servo electric mechanism. In some aspects, the system further includes an actuator coupled to the configuration mechanism.

In some aspects, the input device is a handheld device. In some aspects, the controller is further configured to receive a user input from the input device, the user input indicating a desired vehicle configuration. In some aspects, the system further includes a plurality of sensors configured to measure and capture data on one or more vehicle characteristics. In some aspects, the plurality of sensors includes one or more of a RADAR sensor, a LIDAR sensor, an optical camera, a thermal camera, an ultrasonic sensor, an occupant sensor, and an ANC microphone.

In another aspect, an automotive vehicle includes a vehicle body structure including a roof and a main body, the roof supported by a roof support system, a configuration system located in the roof support system, the configuration system configured to alter a vehicle configuration, at least one vehicle sensor, a communication system, and a controller in communication with the at least one vehicle sensor, the configuration system, and the communication system, the controller configured to receive sensor data corresponding to a physical environment of an interior of the vehicle from the at least one vehicle sensor, determine the vehicle configuration based on the sensor data, generate a control signal based on the vehicle configuration, and automatically control the configuration system according to the control signal to alter the vehicle body structure from a first configuration to a second configuration.

In some aspects, the configuration system includes one or more of a gear mechanism, a hydraulic mechanism, a pneumatic mechanism, and an electric servo mechanism. In some aspects, the controller is further configured to receive a user input from an input device, the user input indicating a desired vehicle configuration. In some aspects, the controller is further configured to control the configuration system to alter the vehicle body structure from the second configuration to the first configuration. In some aspects, the roof is positioned at a first height in the first configuration and positioned at a second height in the second configuration and the second height is less than the first height. In some aspects, the roof is a convertible roof top.

In yet another aspect, an automotive vehicle includes a vehicle body structure including a roof, a roof support system, and a main body, a configuration system located in the vehicle body structure, the configuration system configured to alter a vehicle configuration, at least one vehicle sensor, a communication system, and a controller in communication with the at least one vehicle sensor, the configuration system, and the communication system, the controller configured to receive sensor data corresponding to a physical environment of an interior of the vehicle from the at least one vehicle sensor, determine the vehicle configuration based on the sensor data, generate a control signal based on the vehicle configuration, and automatically control the configuration system according to the control signal to alter the vehicle body structure from a first configuration to a second configuration.

In some aspects, the roof comprises a first roof portion and a second roof portion. In some aspects, in the first configuration the first roof portion and the second roof portion form a continuous vehicle roof and in the second configuration the first roof portion and the second roof portion retract within the main body.

In another aspect, a method for adjusting a vehicle configuration is disclosed. The method includes the steps of providing a vehicle having a vehicle body structure including an adjustable roof, a roof support system, and a main body, providing the vehicle with a configuration system configured to alter the vehicle configuration from a first configuration to a second configuration and a controller in communication with the configuration system, determining, by the controller, an occupancy status of the vehicle, and generating, by the controller, a configuration control signal based on the occupancy status of the vehicle and the time to complete the configuration change.

In yet another aspect, a method for adjusting a vehicle configuration is disclosed. The method includes the steps of providing a vehicle having a vehicle body structure and an adjustable body portion, providing the vehicle with a configuration system configured to alter the vehicle configuration from a first configuration to a second configuration and a controller in communication with the configuration system, receiving, by the controller, a user input defining a vehicle configuration preference, and generating, by the controller, a configuration control signal based on the user input.

The above advantages and other advantages and features of the present disclosure will be apparent from the following detailed description of exemplary embodiments when taken in connection with the accompanying drawings.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
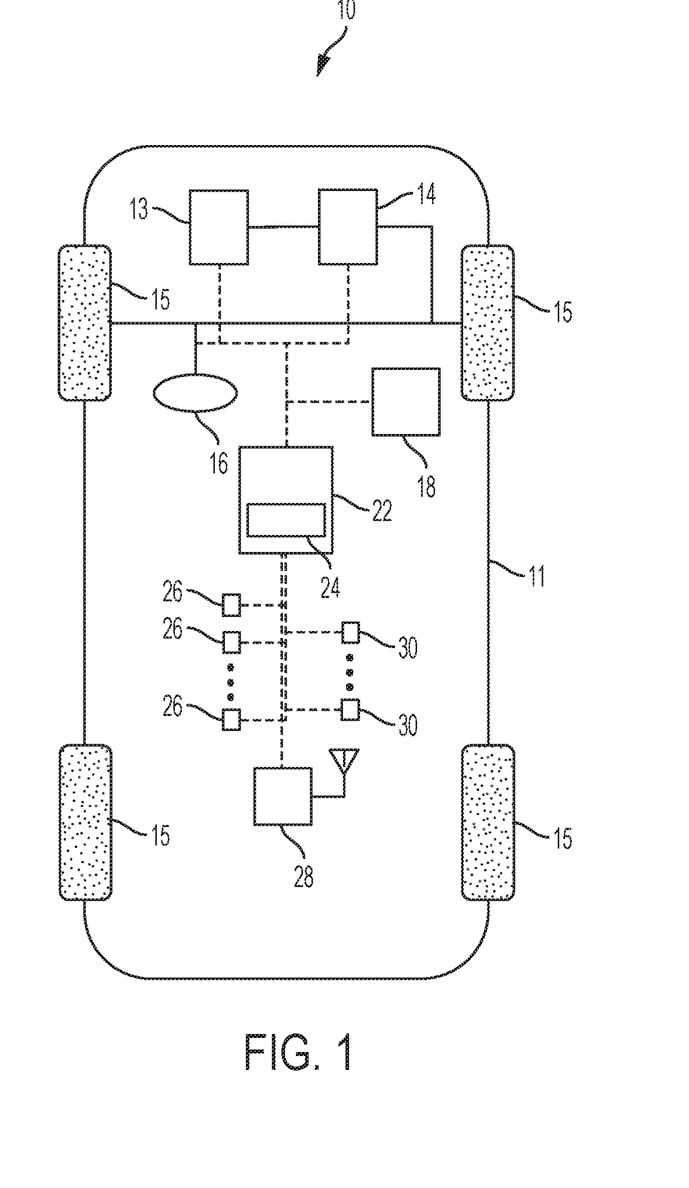
FIG. 1 is a schematic diagram of a vehicle having a configuration system to adjust a vehicle geometry, according to an embodiment.

FIG. 1 schematically illustrates an automotive vehicle 10 according to the present disclosure. The vehicle 10 generally includes a main body or body 11 and wheels 15. The body 11 encloses the other components of the vehicle 10. The wheels 15 are each rotationally coupled to the body 11 near a respective corner of the body 11. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission. The vehicle 10 additionally includes wheel brakes (not shown) configured to provide braking torque to the vehicle wheels 15. The wheel brakes may, in various embodiments, include friction brakes, a regenerative braking system such as an electric machine, and/or other appropriate braking systems.

The vehicle 10 additionally includes a steering system 16. While depicted as including a steering wheel and steering column for illustrative purposes, in some embodiments, the steering system 16 may not include a steering wheel. In various embodiments, the vehicle 10 also includes a wireless communication system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards, using Bluetooth, or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. In the illustrated embodiment, the communication system 28 includes an antenna electrically connected to a receiver.

With continued reference to FIG. 1, the vehicle 10 also includes a vehicle configuration system 18. The vehicle configuration system 18 includes at least one mechanism to adjust a vehicle geometry, as discussed in greater detail below. The mechanism may be a hydraulic mechanism, a mechanical mechanism such as a rack and pinion gear system, a pneumatic mechanism, or an electric servo mechanism. In some embodiments, the vehicle configuration system 18 is located within one or more vehicle support pillars, such as an A pillar, B pillar, etc. to adjust the vehicle geometry including, for example, changing the vehicle height by raising and/or lowering at least a section of the vehicle roof. In some embodiments, the configuration system 18 is located within the vehicle body 11 and is configured to adjust the frontal area of the vehicle 10 by adjusting one or more vehicle body panels. In some embodiments, the configuration system 18 is configured to alter the frontal cross section of the vehicle 10. In some embodiments, the configuration system 18 is configured to reduce a vehicle stance by adjusting a ride height of the vehicle from a first ride height to a second ride height that is less than the first ride height.

With further reference to FIG. 1, the vehicle 10 also includes a plurality of sensors 26 configured to measure and capture data on one or more vehicle characteristics, including but not limited to vehicle speed, steering angle, vehicle heading, and vehicle occupancy. In the illustrated embodiment, the sensors 26 include, but are not limited to, an accelerometer, a speed sensor, a heading sensor, gyroscope, steering angle sensor, a weight sensor, one or more ambient noise cancelling (ANC) microphones mounted within the passenger compartment, or other sensors that sense observable conditions of the vehicle, the passenger compartment of the vehicle, or the environment surrounding the vehicle and may include GPS, RADAR, LIDAR, optical cameras, thermal cameras, ultrasonic sensors, occupant sensors, and/or additional sensors as appropriate. The vehicle 10 also includes a plurality of actuators 30 configured to receive control commands to control steering, shifting, throttle, braking, a vehicle geometry via the vehicle configuration system, or other aspects of the vehicle 10, as discussed in greater detail below.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

In some embodiments, the controller 22 includes an automated driving assistance system (ADAS) 24. In an exemplary embodiment, the ADAS 24 is configured to receive information, including navigation information, from the plurality of sensors 26, analyze the sensor and navigation input, determine a vehicle configuration geometry, determine a projected vehicle path, and automatically control the actuators 30 based on the projected vehicle path and the desired vehicle configuration geometry.

Figure 2:
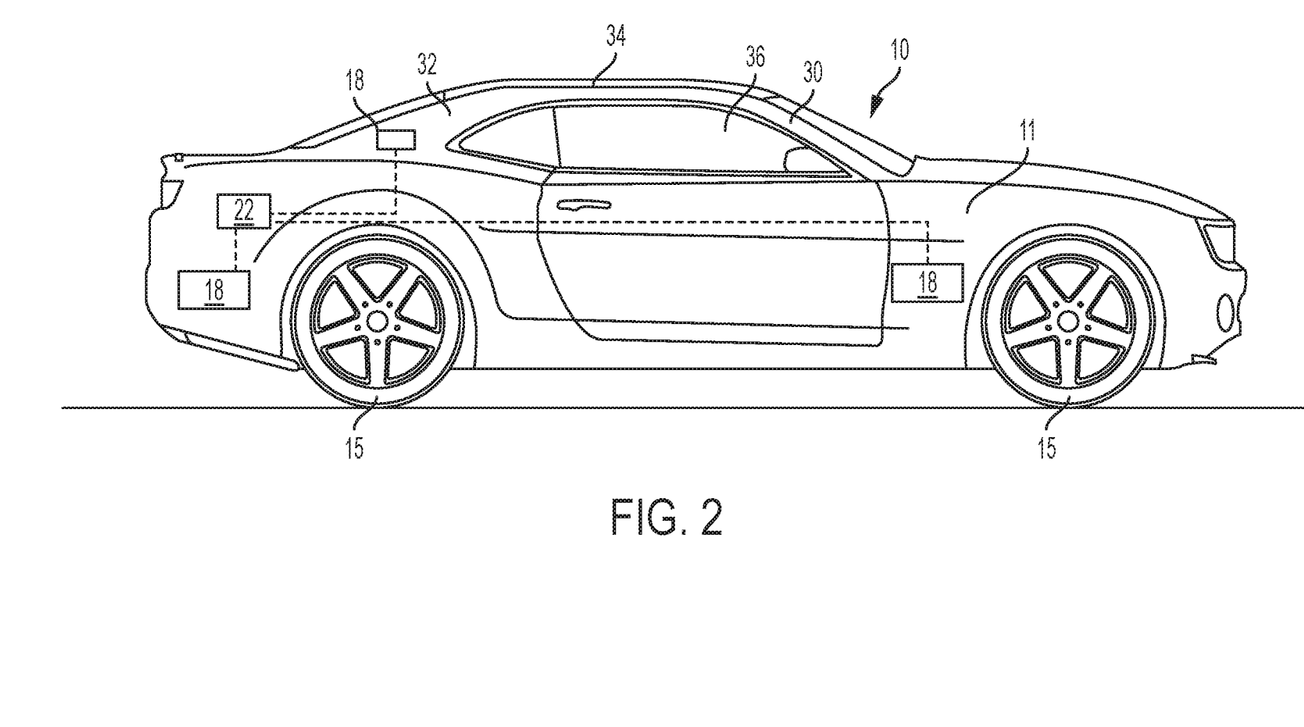
FIG. 2 is a schematic side view of the vehicle of FIG. 1, according to an embodiment.

FIG. 2 schematically illustrates a side view of the vehicle 10. The body 11 of the vehicle 10 includes a vehicle roof 34 supported by a roof support system including forward supports 30 (only one shown) and rear supports 32 (only one shown). The roof 34 defines an interior volume or passenger compartment 36 of the vehicle 10. In some embodiments, the vehicle configuration system 18 is located within the body 11 of the vehicle 10. As shown in FIG. 2, the vehicle configuration system 18 can, in some embodiments, be located within one or more of the rear supports 32. In some embodiments, the vehicle configuration system 18 can be located in one or more of the forward supports 30, in one or more of the rear supports 32, within both the forward supports 30 and the rear supports 32, within a rear section of the body 11, within a central section of the body 11, or within a forward section of the body 11 of the vehicle 10. In some embodiments, the body 11 may enclose multiple configuration systems 18. Each of the configuration systems 18 is electrically connected to the controller 22. As discussed in greater detail below, the configuration systems 18 are configured to adjust one or more aspects of the geometry of the vehicle 10, such as, for example and without limitation, adjusting a vehicle height by raising and/or lowering at least a section of the vehicle roof, adjusting a vehicle frontal area by moving side body panels of the vehicle 10, adjusting panels to cover one or more of the tires of the vehicle 10, extending or retracting peripherals of the vehicle 10 such as antennas, etc.

Figure 3:
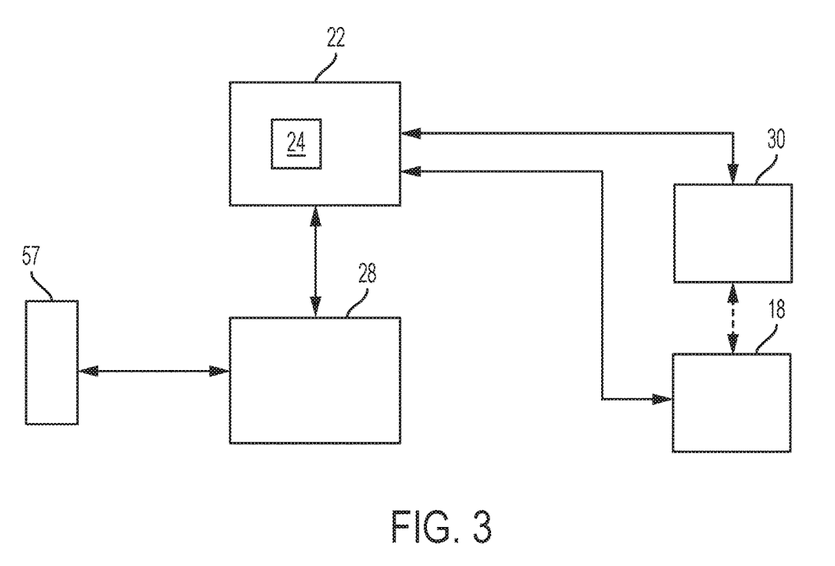
FIG. 3 is a block diagram of a configuration system illustrating an interaction with a handheld device, according to an embodiment.

FIG. 3 illustrates a schematic block diagram of a communication interface between a handheld device 57, such as a mobile phone, tablet, etc. operated by a user, the wireless communication system 28 of the vehicle 10, and one or more actuators 30 and configuration systems 18 of the vehicle 10. As discussed above, the controller 22 includes an ADAS 24 that, among other features, is configured to receive information from the plurality of sensors 26 of the vehicle 10, analyze the sensor and navigation input, determine a vehicle configuration geometry, determine a projected vehicle path, and automatically control the actuators 30 and/or the configuration system 18 based on the projected vehicle path and the desired vehicle configuration geometry. As discussed above, the actuators 30 are configured to receive one or more control signals from the controller 22. In some embodiments, the control signal includes instructions for vehicle steering, braking, throttle, or shifting. In some embodiments, the control signal includes instructions for modifying a vehicle configuration to optimize aerodynamic performance and vehicle sizing, for example, vehicle interior headroom, based on occupant preference. The configuration system 18 is in electronic communication with the controller 22 and, in some embodiments, with the actuators 30. The configuration system 18 is configured to adjust the geometry of the vehicle based on, for example, user input, a detected vehicle capacity or a detected vehicle environment (e.g., an urban environment or a rural environment). In some embodiments, the configuration system 18 is configured to receive a control signal directly from the controller 22. In some embodiments, the components of the configuration system 18 are controlled by one or more of the actuators 30, which are configured to receive a control signal from the controller 22.

The communication system 28 is in electronic communication with the controller 22. The communication system 28 is configured to wirelessly communicate with other vehicles ("V2V") and/or infrastructure ("V2I"). In some embodiments, the communication system 28 is configured to wirelessly communicate with a handheld device, such as the device 57, used by an operator or passenger to select a desired vehicle configuration. As discussed in greater detail below, the operator or passenger can input a desired vehicle configuration based on, for example and without limitation, an expected capacity including a number of expected passengers or occupants. This input is received by the various modules of the controller 22 which use this input to determine one or more control signals sent to the actuators 30 and/or the configuration system 18. The actuators 30 and/or the configuration system 18 receive the one or more control signals and act to adjust the vehicle configuration by, for example and without limitation, raising and/or lowering the roof, adjusting vehicle side panels, raising or lowering vehicle peripherals, etc.

Figure 4A:
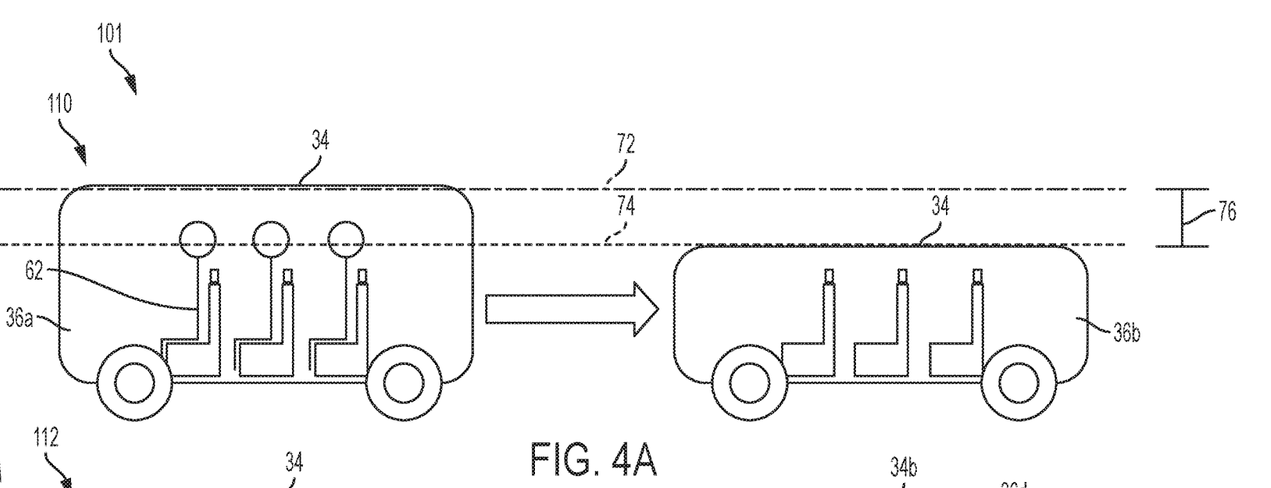
FIG. 4A is a schematic illustration of a vehicle geometry configuration change, according to an embodiment.

FIGS. 4A-8 illustrate several embodiments of a vehicle configured to change a configuration geometry based on, for example and without limitation, a user input or an occupancy detection. FIG. 4A illustrates one embodiment of a vehicle configuration change 101 affecting the vehicle interior volume, for example, passenger headroom in the passenger compartment. FIG. 4A illustrates the vehicle 110, such as the vehicle 10 shown in FIGS. 1 and 2, undergoing the configuration change 101 from a first vehicle configuration (shown on the left) to a second vehicle configuration (shown on the right). In the first vehicle configuration, the vehicle 110 has a first vehicle interior area 36a defined by the vehicle body including the roof 34. The vehicle 110 in the first configuration holds at least three passengers 62. As the vehicle 110 changes to the second configuration, the roof 34 adjusts from a first height 72 to a second height 74. In the second configuration, the vehicle 110 has an interior area 36b that is less than the interior area 36a of the vehicle 110 in the first configuration. In some embodiments, the height change 76 resulting from the change in height from the first height 72 to the second height 74 (or vice versa) is commanded in response to a user input received from a mobile device, such as the device 57 shown in FIG. 3. In some embodiments, the height change 76 is commanded in response to input from one or more of the sensors 26, which may include, for example and without limitation, an occupant sensor, an ANC microphone mounted within the passenger compartment, a camera capturing an image of the interior of the vehicle 110, a camera capturing an image of the environment of the vehicle 110, etc. In the second configuration, the vehicle 110 is not expected to transport passengers and therefore the vehicle roof height is lowered to optimize vehicle aerodynamics, among other benefits.

Figure 4B:
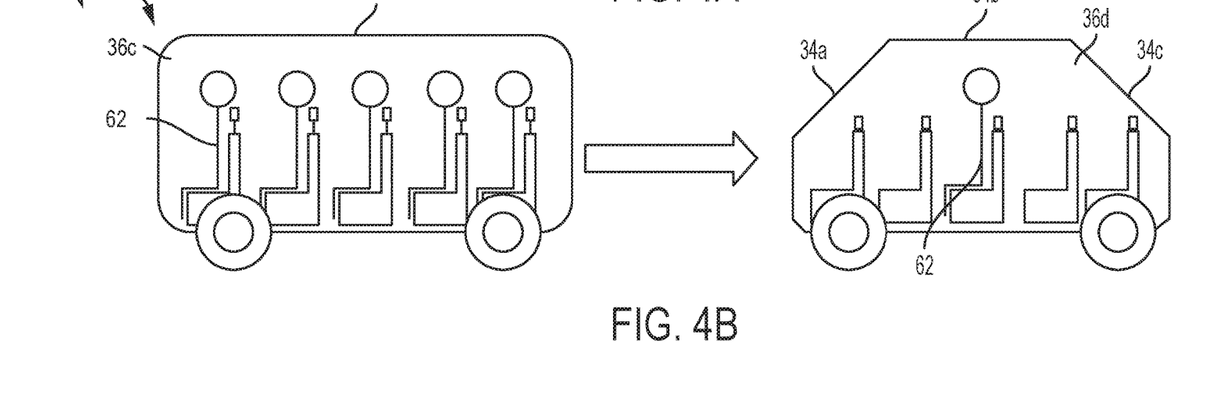
FIG. 4B is a schematic illustration of a vehicle geometry configuration change, according to another embodiment.

FIG. 4B illustrates another embodiment of a vehicle configuration change affecting the passenger headroom and passenger compartment area of the vehicle 112. The vehicle 112, such as the vehicle 10 shown in FIGS. 1 and 2, is shown undergoing a configuration change 102 from a first vehicle configuration (shown on the left) to a second vehicle configuration (shown on the right). In the first vehicle configuration, the vehicle 112 has a first vehicle interior area 36c defined by the vehicle body including the roof 34. The vehicle 112 in the first configuration holds a plurality of passengers 62. As the vehicle 112 changes to the second configuration, the roof 34 adjusts from a straight profile to an angled profile defined by three segments 34a, 34b, 34c. In the second configuration, the vehicle 112 has an interior area 36d that is less than the interior area 36c of the vehicle 112 in the first configuration. The three segments 34a, 34b, 34c allow the vehicle configuration to adjust to accommodate fewer passengers 62, such as a passenger 62 positioned in a central portion of the area 36d. In some embodiments, the configuration change 102 shown in FIG. 4B is commanded in response to input from one or more of the sensors 26, which may include, for example and without limitation, an occupant sensor, an ANC microphone mounted within the passenger compartment, a camera capturing an image of the interior of the vehicle 112, etc. In some embodiments, the configuration change 102 is commanded in response to a user input received from the device 57. In the second configuration, the vehicle 112 is not expected to transport as many passengers as when the vehicle 112 is in the first configuration and therefore the vehicle roof configuration is modified to optimize vehicle aerodynamics, among other benefits.

Figure 5A:
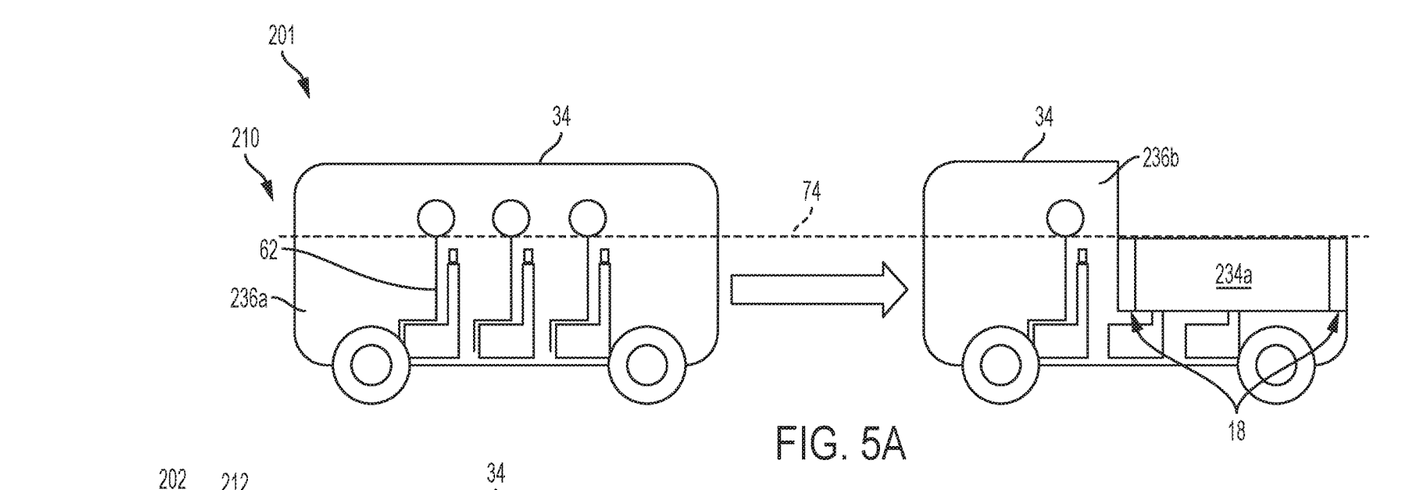
FIG. 5A is a schematic illustration of a vehicle geometry configuration change, according to another embodiment.

FIGS. 5A and B illustrate two additional embodiments of a vehicle configuration change. FIG. 5A illustrates one embodiment of a vehicle configuration change 201 in which a portion of the vehicle roof 34 is stored within the interior space of the vehicle 210. FIG. 5A illustrates the vehicle 210, such as the vehicle 10 shown in FIGS. 1 and 2, undergoing the configuration change 201 from a first vehicle configuration (shown on the left) to a second vehicle configuration (shown on the right). In the first vehicle configuration, the vehicle 210 has a first vehicle interior area 236a defined by the vehicle body including the roof 34. The vehicle 210 in the first configuration holds at least three passengers 62. As the vehicle 210 changes to the second configuration, a portion of the roof 34 adjusts from a first height to a second height 74. In the second configuration, the vehicle 210 has an interior area 236b that is less than the interior area 236a of the vehicle 210 in the first configuration. In some embodiments, the height change is commanded in response to a user input received from a mobile device, such as the device 57 shown in FIG. 3. In some embodiments, the height change is commanded in response to input from one or more of the sensors 26, which may include, for example and without limitation, an occupant sensor, an ANC microphone mounted within the passenger compartment, a camera capturing an image of the interior of the vehicle 210, etc. In the second configuration, the vehicle 210 has a roof storage area 234a to store the lowered portion of the roof 34. In some embodiments, the roof storage area 234a occupies a portion of the interior area 236b of the vehicle 210. In some embodiments, the roof storage area 234a is along one or more sides of the vehicle 210. One or more configuration systems 18 (two are shown in the second configuration illustrated in FIG. 5A) act to lower the portion of the roof 34 such that the portion is stored in the storage area 234a. In some embodiments, the configuration system 18 is a rack and pinion system. In some embodiments, the configuration system 18 is a hydraulic system. In some embodiments, the configuration system 18 is a pneumatic system. In some embodiments, the configuration system 18 is a servo electric system. The configuration system 18 is located within the body structure of the vehicle 210, as shown in FIG. 2 and discussed above.

Figure 5B:
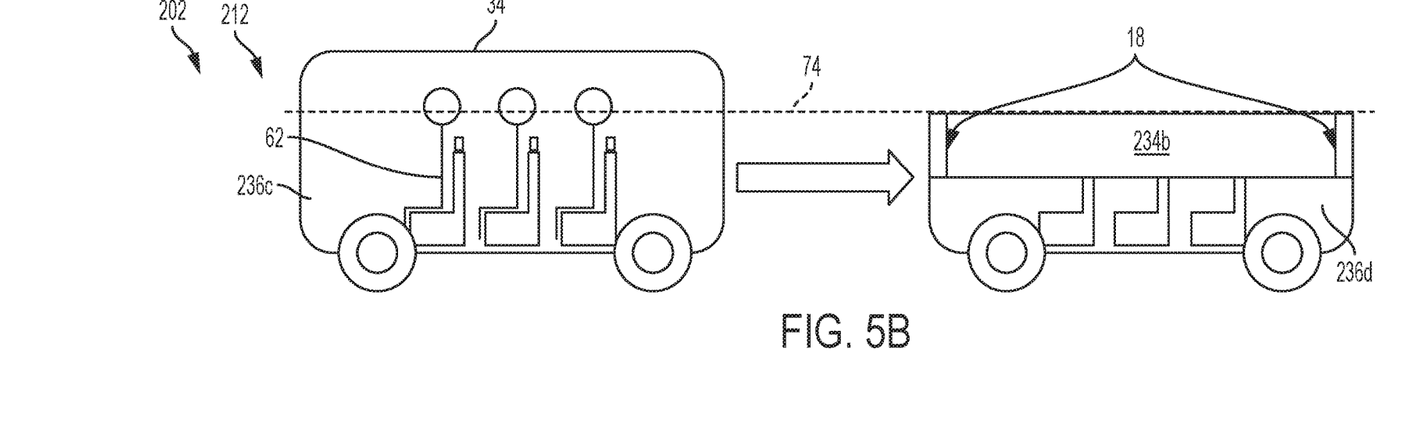
FIG. 5B is a schematic illustration of a vehicle geometry configuration change, according to another embodiment.

FIG. 5B illustrates another embodiment of a vehicle configuration change affecting the passenger headroom of the vehicle 212. The vehicle 212, such as the vehicle 10 shown in FIGS. 1 and 2, is shown undergoing a configuration change 202 from a first vehicle configuration (shown on the left) to a second vehicle configuration (shown on the right). In the first vehicle configuration, the vehicle 212 has a first vehicle interior area 236c defined by the vehicle body including the roof 34. The vehicle 212 in the first configuration holds a plurality of passengers 62. As the vehicle 212 changes to the second configuration, the entirety of the roof 34 lowers to the height 74 and is stored in the roof storage area 234b. In the second configuration, the vehicle 212 has an interior area 236d that is less than the interior area 236c of the vehicle 212 in the first configuration. In some embodiments, the configuration change 202 shown in FIG. 5B is commanded in response to input from one or more of the sensors 26, which may include, for example and without limitation, an occupant sensor, an ANC microphone mounted within the passenger compartment, a camera capturing an image of the interior of the vehicle 212, etc. In some embodiments, the configuration change 202 is commanded in response to a user input received from the device 57. In the second configuration, the vehicle 212 is not expected to transport passengers and therefore the vehicle roof configuration is modified to optimize vehicle aerodynamics, among other benefits. In some embodiments, the roof storage area 234b occupies a portion of the interior area 236d of the vehicle 212. In some embodiments, the roof storage area 234b is along one or more sides of the vehicle 212. One or more configuration systems 18 (two are shown in the second configuration illustrated in FIG. 5B) act to lower the entirety of the roof 34 such that the roof 34 is stored in the storage area 234b. In some embodiments, the configuration system 18 is a rack and pinion system. In some embodiments, the configuration system 18 is a hydraulic system. In some embodiments, the configuration system 18 is a pneumatic system. In some embodiments, the configuration system 18 is a servo electric system. The configuration system 18 is located within the body structure of the vehicle 212, as shown in FIG. 2 and discussed above.

Figure 6:
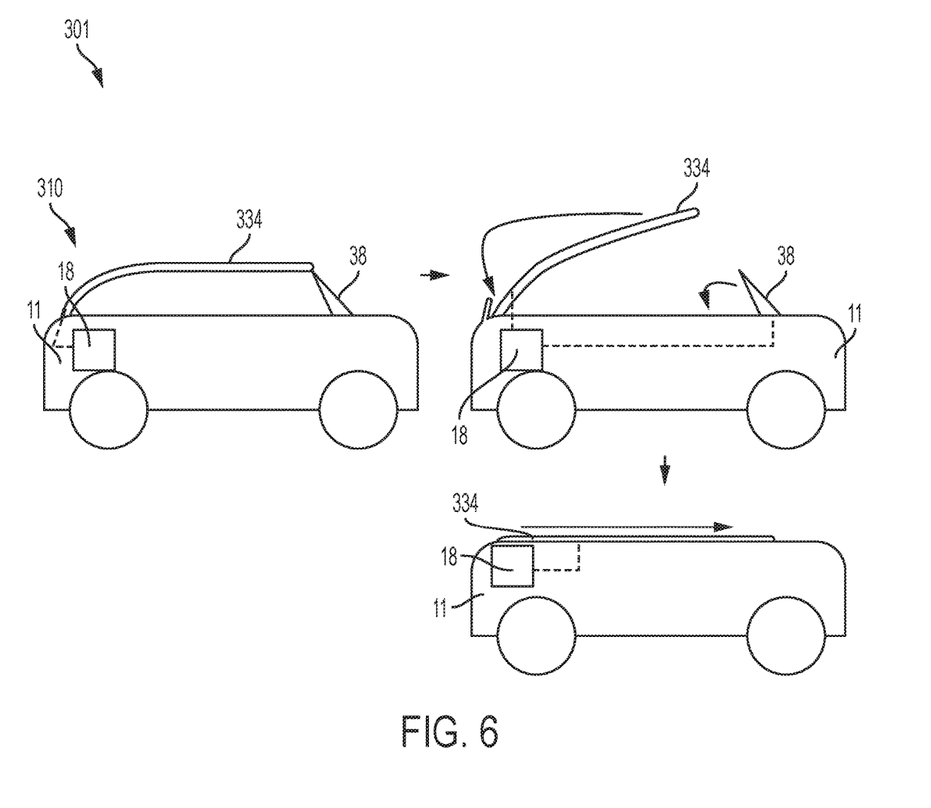
FIG. 6 is a schematic illustration of a vehicle geometry configuration change, according to another embodiment.

FIG. 6 illustrates another embodiment of a vehicle configuration change 301. The vehicle 310, such as the vehicle 10 shown in FIGS. 1 and 2, is a convertible having a convertible roof top 334. As the vehicle 310 changes from the first configuration (shown on the top row, left) to the second configuration (shown on the top row, right) to the third configuration (shown on the bottom row), the roof 334 is folded down to cover the passenger compartment of the body 11 of the vehicle 310 using an existing convertible top architecture of the vehicle 310. In some embodiments, the convertible roof top 334 is made of a flexible material, such as canvas, which is able to be easily maneuvered by the configuration system 18 into place covering the passenger compartment, as shown in the third configuration. In some embodiments, a windshield 38 of the vehicle 310 is able to be folded down into the body 11 of the vehicle 310. As shown in FIG. 6, the configuration system 18 is connected, electrically and/or mechanically, to the roof 334 or to the windshield 38 or to both. In some embodiments, the configuration system 18 can be used to both fold the windshield 38 down into the body 11 and move the convertible roof 334 to cover the passenger compartment. In some embodiments, the configuration system 18 is a mechanical system, such as a rack and pinion system or a gear reduction system. In some embodiments, the configuration system 18 is a hydraulic system. In some embodiments, the configuration system 18 is a pneumatic system. In some embodiments, the configuration system 18 is a servo electric system. The configuration system 18 is located within the body structure of the vehicle 310, as shown in FIG. 2 and discussed above. In some embodiments, the configuration change 301 shown in FIG. 6 is commanded in response to input from one or more of the sensors 26, which may include, for example and without limitation, an occupant sensor, an ANC microphone mounted within the passenger compartment, a camera capturing an image of the interior of the vehicle 310, etc. In some embodiments, the configuration change 301 is commanded in response to a user input received from the device 57.

Figure 7:
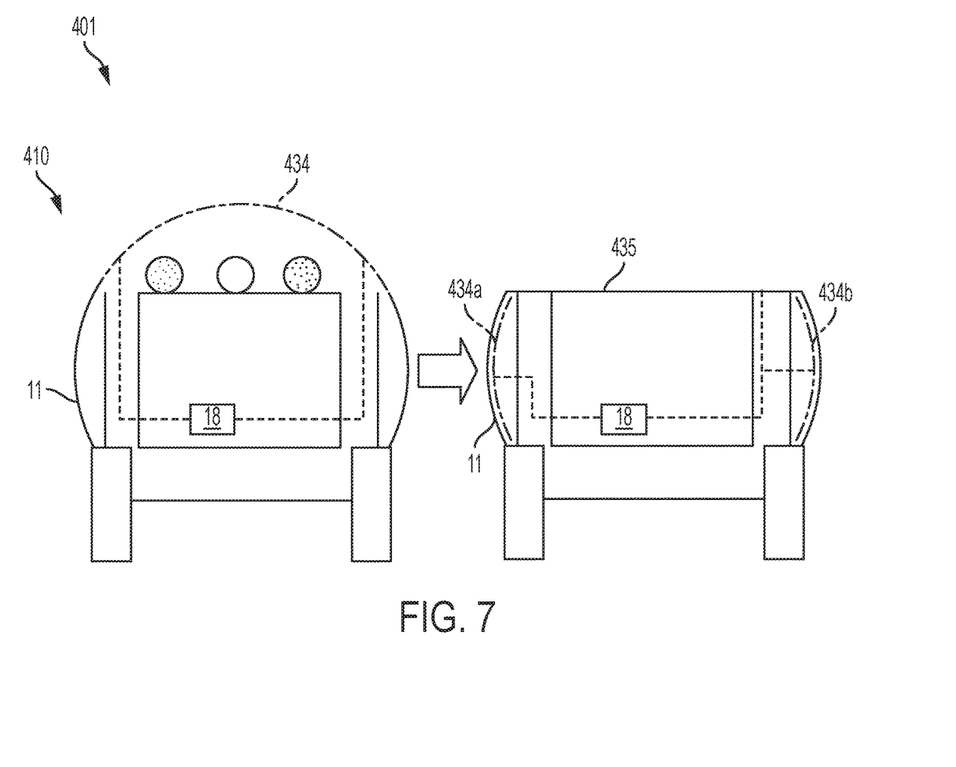
FIG. 7 is a schematic illustration of a vehicle geometry configuration change, according to another embodiment.

FIG. 7 illustrates another embodiment of a vehicle configuration change 401. The vehicle 410, such as the vehicle 10 shown in FIGS. 1 and 2, is a vehicle having a retractable dome roof 434. As the vehicle 410 changes from the first configuration (shown on the left) to the second configuration (shown on the right), the roof 434 splits into two portions 434a, 434b. In some embodiments, the configuration system 18 controls the separation of the roof portions 434a, 434b. Each of the roof portions 434a, 434b is stored within the body 11 of the vehicle 410. In some embodiments, the portion 434a is stored along the left side of the vehicle 410 and the portion 434b is stored along the right side of the vehicle 410. In some embodiments, to improve the aerodynamics of the vehicle 410, a cover 435 extends over the passenger compartment of the vehicle 410 when the portions 434a, 434b of the roof 434 are stored within the body of the vehicle 410. In some embodiments, the cover 435 is made of a flexible material, such as canvas. In some embodiments, the cover 435 is stored in a rolled configuration prior to being unrolled by, for example, the configuration system 18, to cover the passenger compartment. In some embodiments, the configuration system 18 is a mechanical system, such as a rack and pinion system or a gear reduction system. In some embodiments, the configuration system 18 is a hydraulic system. In some embodiments, the configuration system 18 is a pneumatic system. In some embodiments, the configuration system 18 is a servo electric system. In some embodiments, the configuration change 401 shown in FIG. 7 is commanded in response to input from one or more of the sensors 26, which may include, for example and without limitation, an occupant sensor, an ANC microphone mounted within the passenger compartment, a camera capturing an image of the interior of the vehicle 410, etc. In some embodiments, the configuration change 401 is commanded in response to a user input received from the device 57.

Figure 8:
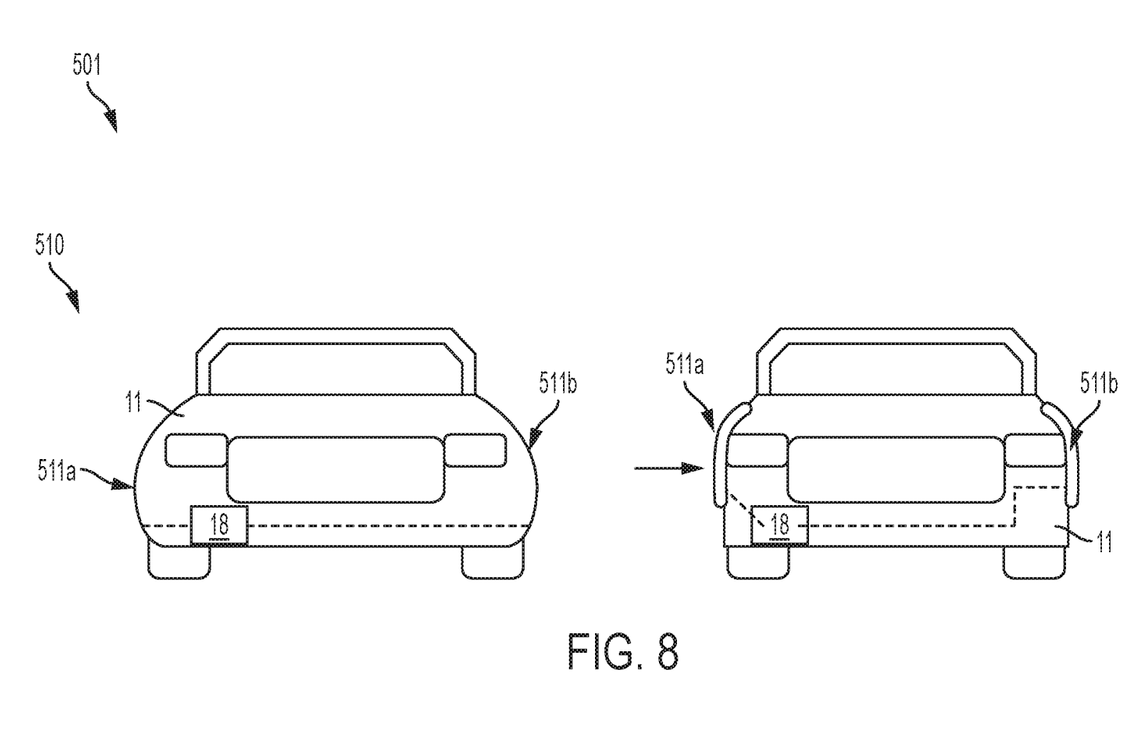
FIG. 8 is a schematic illustration of a vehicle geometry configuration change, according to another embodiment.

FIG. 8 illustrates yet another embodiment of a vehicle configuration change 501. The vehicle 510, such as the vehicle 10 shown in FIGS. 1 and 2, is a vehicle having adjustable side body panels 511a, 511b, such as fenders, that reduce the frontal area and width of the vehicle 510. As the vehicle 510 changes from the first configuration (shown on the left) to the second configuration (shown on the right), the side panels 511a, 511b of the vehicle 510 are moved inwards and upwards to nest into the sides of the body 11 of the vehicle 510 to reduce the frontal area of the vehicle 510. Reduced frontal area provides improvements in aerodynamics, among other benefits such as ease of access into narrow parking locations or vehicle charging stations. In some embodiments, the configuration system 18 is configured to adjust the panels 511a, 511b from the first configuration to the second configuration. In some embodiments, the configuration system 18 is a mechanical system, such as a rack and pinion system or a gear reduction system. In some embodiments, the configuration system 18 is a hydraulic system. In some embodiments, the configuration system 18 is a pneumatic system. In some embodiments, the configuration system 18 is a servo electric system. In some embodiments, the configuration change 501 shown in FIG. 8 is commanded in response to input from one or more of the sensors 26, including, for example and without limitation, a camera capturing an image of an external environment of the vehicle 510. In some embodiments, the configuration change 501 is commanded in response to a user input received from the device 57.

Figure 9:
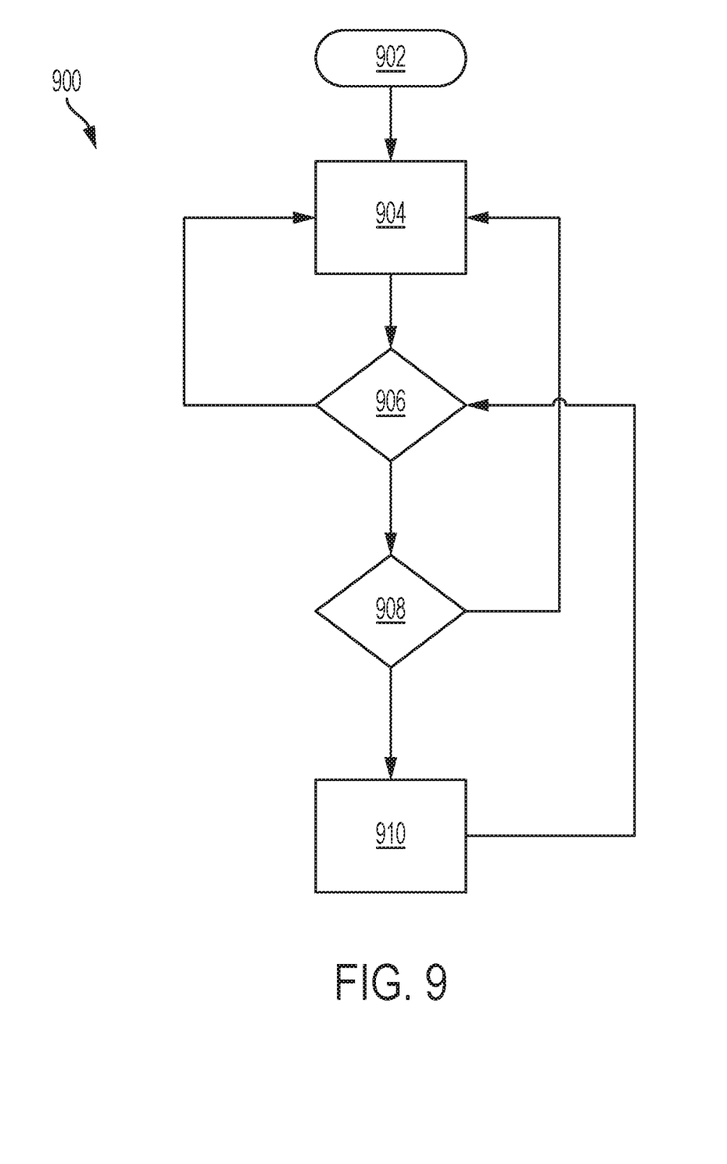
FIG. 9 is a flow chart of a method to reconfigure a vehicle geometry based on an occupancy of the vehicle, according to an embodiment.

FIG. 9 is a flow chart of a method 900 illustrating the process by which the configuration system 18 can adjust a vehicle configuration from a first configuration to a second configuration. The method 900 can be utilized in connection with the vehicle, such as any of the vehicles 10, 110, 112, 210, 212, 310, 410, 510 discussed above with reference to FIGS. 4A-8, the controller 22, the configuration system 18, and a handheld device, such as the device 57, in accordance with exemplary embodiments. The order of operation of the method 900 is not limited to the sequential execution as illustrated in FIG. 9 but may be performed in one or more varying orders as applicable and in accordance with the present disclosure.

As shown in FIG. 9, starting at 902, the method 900 proceeds to step 904. At 904, the vehicle 10 is set to or maintained at an initial configuration. The initial configuration may be set by the operator, by providing input via the device 57, or by the controller 22 upon receipt of sensor data from the sensors 26. In some embodiments, the initial configuration is one in which the vehicle 10 is configured to accommodate a plurality of passengers or occupants, such as the first configurations illustrated in FIGS. 4A-5B. Next, at 906, a determination is made regarding the occupancy status of the vehicle 10, that is, whether the vehicle 10 is occupied. Determination of whether the vehicle 10 is occupied is made, in some embodiments, by one or more of the sensors 26 including, for example, an occupant sensor, a weight sensor, an ANC microphone mounted within the passenger compartment, or a camera configured to capture an image of the interior space of the vehicle 10. The sensor data obtained by one or more of the sensors 26 is processed by the controller 22. If the vehicle 10 is occupied by one or more occupants, the method 900 returns to 904 and the initial configuration is maintained.

However, if the vehicle 10 is no longer occupied, the method 900 proceeds to 908. At 908, a determination is made by the controller 22 regarding whether there is sufficient time expected between a first set of occupants departing the vehicle 10 and a second set of occupants entering the vehicle 10 to perform a vehicle configuration change. In some embodiments, a predetermined time to complete a configuration change is stored within a storage medium of the controller 22. The predetermined time depends on the type of configuration change, such as, for example, the configuration changes shown in FIGS. 4A-8. In some embodiments, determination of a time between sets of occupants is based on input received from one or more of the sensors 26, such as images from one or more cameras capturing images of an external and/or internal environment of the vehicle 10. In some embodiments, determination of a time between sets of occupants is based on user input received from the device 57 indicating that one or more users has reserved space in, booked, signaled, or otherwise indicated an intent to enter the vehicle 10. If the controller 22 determines that the vehicle 10 will be occupied by a new set of occupants before the predetermined time has elapsed, the process 900 returns to 904 and the current vehicle configuration is maintained.

However, if the controller 22 determines that the predetermined time will elapse between occupation of the vehicle 10, the method 900 proceeds to 910. At 910, the controller 22 generates a configuration control signal that is transmitted to the configuration system 18 and the configuration system 18 of the vehicle 10 completes a configuration change, such as one or more of the configuration changes illustrated in FIGS. 4A-8. The method 900 then returns to 906 and proceeds as discussed above.

Figure 10:
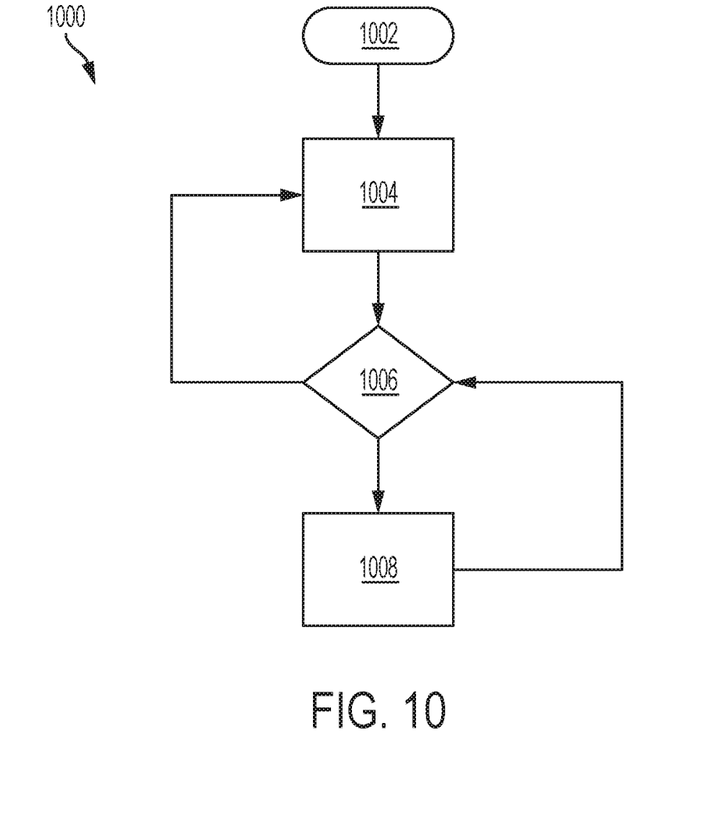
FIG. 10 is a flow chart of a method to reconfigure a vehicle geometry based on a user-defined geometry, according to an embodiment.

FIG. 10 is a flow chart of a method 1000 illustrating the process by which the configuration system 18 can adjust a vehicle configuration from a first configuration to a second configuration. The method 1000 can be utilized in connection with the vehicle, such as any of the vehicles 10, 110, 112, 210, 212, 310, 410, 510 discussed above with reference to FIGS. 4A-8, the controller 22, the configuration system 18, and a handheld device, such as the device 57, in accordance with exemplary embodiments. The order of operation of the method 1000 is not limited to the sequential execution as illustrated in FIG. 10 but may be performed in one or more varying orders as applicable and in accordance with the present disclosure.

Starting at 1002, the method 1000 proceeds to step 1004. At 1004, the vehicle 10 is set to or maintained at an initial configuration. The initial configuration may be set by the operator, by providing input via the device 57, or by the controller 22 upon receipt of sensor data from one or more of the sensors 26. In some embodiments, the initial configuration is one in which the vehicle 10 is configured to accommodate a plurality of passengers or occupants, such as the first configurations illustrated in FIGS. 4A-5B. In some embodiments, the initial configuration is one in which the vehicle 10 is not configured to accommodate a plurality of passengers or occupants, such as the second configurations illustrated in FIGS. 4A-5B. Next, at 1006, a determination is made regarding whether the controller 22 has received a user input defining a vehicle geometry or configuration preference. A user-defined vehicle geometry preference is one or more of the first or second vehicle configurations shown in FIGS. 4A-8. In some embodiments, the controller 22 receives the user input from a mobile device, such as the device 57. In some embodiments, the controller 22 receives the user input from a user interface, such as a button, knob, dial, keyboard, etc. located on or within the vehicle 10. If the controller 22 receives the user input defining the vehicle geometry preference, the method 1000 proceeds to 1008. At 1008, the controller 22 generates a configuration control signal that is transmitted to the configuration system 18 and the configuration system 18 of the vehicle 10 completes a configuration change, such as one or more of the configuration changes illustrated in FIGS. 4A-8. The method 1000 then returns to 1006 and proceeds as discussed above.

However, if the controller 22 does not receive the user input defining the vehicle geometry preference, the method 1000 returns to 1004 and the initial configuration is maintained and no vehicle configuration change is implemented. The method 1000 then proceeds as discussed above.

FIGS. 4A-8 illustrate several embodiments of vehicle configuration changes from a first configuration to a second configuration. While each of these embodiments is shown and discussed separately, one or more of the configuration changes shown in FIGS. 4A-8 can be implemented simultaneously on the vehicle 10, depending on the type and structure of the vehicle. Additionally, any of the configuration changes shown in FIGS. 4A-8 may be completed in a reverse order from the order discussed (that is, from the second configuration to the first configuration).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for reconfiguring a vehicle geometry, comprising:
    a configuration system configured to alter the vehicle geometry;
    a communication system;
    a vehicle occupancy sensor; and
    a controller in communication with the configuration system, the vehicle occupancy sensor, and the communication system, the controller configured to receive a configuration signal from the communication system, receive sensor data from the vehicle occupancy sensor, determine an occupancy status of a vehicle, determine a configuration control signal, and automatically control the configuration system based on the control signal.

2. The system of claim 1 further comprising an input device, wherein the communication system is configured to communicate with the input device.

3. The system of claim 2, wherein the input device is a handheld device.

4. The system of claim 3, wherein the controller is further configured to receive a user input from the input device, the user input indicating a desired vehicle configuration.

5. The system of claim 1, wherein the configuration system includes a rack and pinion mechanism.

6. The system of claim 1, wherein the configuration system includes a pneumatic mechanism.

7. The system of claim 1, wherein the configuration system includes a hydraulic mechanism.

8. The system of claim 1, wherein the configuration system includes a servo electric mechanism.

9. The system of claim 1, further comprising an actuator coupled to the configuration mechanism.

10. The system of claim 1, further comprising a plurality of sensors configured to measure and capture data on one or more vehicle characteristics indicative of the occupancy status of the vehicle, the one or more vehicle characteristics including one or more of an image of a passenger compartment of the vehicle, a noise level of the passenger compartment of the vehicle, and a weight of the passenger compartment of the vehicle.

11. The system of claim 10, wherein the plurality of sensors includes one or more of a RADAR sensor, a LIDAR sensor, an optical camera, a thermal camera, an ultrasonic sensor, an occupant sensor, and an ANC microphone.

12. An automotive vehicle, comprising:
    a vehicle body structure including a roof and a main body, the roof supported by a roof support system;
    a configuration system located in the roof support system, the configuration system configured to alter a vehicle configuration;
    at least one vehicle sensor configured to detect an occupancy status of the vehicle;
    a communication system; and
    a controller in communication with the at least one vehicle sensor, the configuration system, and the communication system, the controller configured to receive sensor data corresponding to the occupancy status of the vehicle from the at least one vehicle sensor, determine the vehicle configuration based on the sensor data, generate a control signal based on the vehicle configuration, and automatically control the configuration system according to the control signal to alter the vehicle body structure from a first configuration to a second configuration.

13. The automotive vehicle of claim 12, wherein the configuration system includes one or more of a gear mechanism, a hydraulic mechanism, a pneumatic mechanism, and an electric servo mechanism.

14. The automotive vehicle of claim 12, wherein the controller is further configured to receive a user input from an input device, the user input indicating a desired vehicle configuration.

15. The automotive vehicle of claim 12, wherein the controller is further configured to control the configuration system to alter the vehicle body structure from the second configuration to the first configuration.

16. The automotive vehicle of claim 12, wherein the roof is positioned at a first height in the first configuration and positioned at a second height in the second configuration and the second height is less than the first height.

17. The automotive vehicle of claim 16, wherein the roof is a convertible roof top.

18. An automotive vehicle, comprising:
    a vehicle body structure including a roof, a roof support system, and a main body;
    a configuration system located in the vehicle body structure, the configuration system configured to alter a vehicle configuration;
    at least one vehicle sensor configured to detect an occupancy status of the vehicle;
    a communication system; and
    a controller in communication with the at least one vehicle sensor, the configuration system, and the communication system, the controller configured to receive sensor data corresponding to an occupancy of an interior of the vehicle from the at least one vehicle sensor, determine the vehicle configuration based on the sensor data, generate a control signal based on the vehicle configuration, and automatically control the configuration system according to the control signal to alter the vehicle body structure from a first configuration to a second configuration.

19. The automotive vehicle of claim 18, wherein the roof comprises a first roof portion and a second roof portion.

20. The automotive vehicle of claim 19, wherein in the first configuration the first roof portion and the second roof portion form a continuous vehicle roof and in the second configuration the first roof portion and the second roof portion retract within the main body.

* * * * *